(12) United States Patent
Levy

(10) Patent No.: US 12,351,224 B1
(45) Date of Patent: Jul. 8, 2025

(54) MODULAR FISH SCALE SLED

(71) Applicant: Hunt Haul LLC, Odessa, FL (US)

(72) Inventor: Daniel Levy, Odessa, FL (US)

(73) Assignee: Hunt Haul LLC, Odessa, FL (US)

( * ) Notice: Subject to any disclaimer, the term of this patent is extended or adjusted under 35 U.S.C. 154(b) by 0 days.

(21) Appl. No.: 18/910,081

(22) Filed: Oct. 9, 2024

Related U.S. Application Data

(60) Provisional application No. 63/564,323, filed on Mar. 12, 2024.

(51) Int. Cl.
*B62B 15/00* (2020.01)

(52) U.S. Cl.
CPC ...... *B62B 15/007* (2013.01); *B62B 2205/006* (2013.01); *B62B 2205/20* (2013.01); *B62B 2501/02* (2013.01); *B62B 2501/04* (2013.01); *B62B 2501/065* (2013.01)

(58) Field of Classification Search
CPC ............ B62B 15/007; B62B 2205/006; B62B 2205/20; B62B 2501/02; B62B 2501/04; B62B 2501/065; B62B 15/00; A61G 1/007; A61G 1/013
See application file for complete search history.

(56) References Cited

U.S. PATENT DOCUMENTS

| | | | | |
|---|---|---|---|---|
| 4,046,393 | A * | 9/1977 | Vadnais | B62B 15/007 280/24 |
| 6,364,324 | B1 * | 4/2002 | Buchanan | B62B 13/06 280/18 |
| 7,810,820 | B2 * | 10/2010 | Wolf | A61G 1/01 280/18 |
| 8,936,253 | B1 * | 1/2015 | Rizzi | A61G 1/042 5/628 |
| 9,950,732 | B1 * | 4/2018 | Patterson | B62B 19/02 |
| 10,099,713 | B1 * | 10/2018 | Hussey | B62B 15/007 |
| 11,597,422 | B1 * | 3/2023 | Beall | B62B 15/007 |
| 11,753,062 | B1 * | 9/2023 | Blount | B62B 15/007 280/19 |
| 11,858,764 | B1 * | 1/2024 | Behrends, III | B65G 7/12 |
| 11,911,318 | B2 * | 2/2024 | Kenalty | A61G 1/044 |
| 11,938,062 | B2 * | 3/2024 | Lockridge | A61G 1/013 |
| 2006/0061050 | A1 * | 3/2006 | Wolf | B62B 15/007 280/18 |

(Continued)

FOREIGN PATENT DOCUMENTS

DE 202010009198 U1 * 10/2010 ............. B62B 13/04

*Primary Examiner* — James A Shriver, II
*Assistant Examiner* — Ian Bryce Shelton
(74) *Attorney, Agent, or Firm* — Colorado Venture Patents LLC

(57) ABSTRACT

A portable sled for transporting cargo in outdoor environments comprises overlapping High-Density Polyethylene (HDPE) sheets arranged in a fish-scale configuration. The design features a structural aluminum body with eye bolts at the front and nylon straps for securing cargo. The sled's fish-scale assembly reduces drag, optimizes weight distribution, and minimizes snagging. Heat-treated HDPE sheets 101 maintain a curved shape when assembled but flatten for storage. The sled incorporates high-visibility colors for safety and is buoyant for water-based operations. Its modular design allows for easy assembly and disassembly in the field, making it highly portable and versatile for various outdoor scenarios.

11 Claims, 7 Drawing Sheets

(56) References Cited

U.S. PATENT DOCUMENTS

| | | | | |
|---|---|---|---|---|
| 2007/0278754 | A1* | 12/2007 | Walkingshaw | A61G 1/007 280/18 |
| 2009/0051132 | A1* | 2/2009 | Masterson | B62B 15/007 280/19 |
| 2009/0160144 | A1* | 6/2009 | Kleinsasser | B62B 15/007 280/19 |
| 2013/0276227 | A1* | 10/2013 | Kenalty | A61G 1/044 5/81.1 R |
| 2016/0021868 | A1* | 1/2016 | Martinez | A01M 31/006 280/19 |
| 2018/0271723 | A1* | 9/2018 | Adkins | A61G 1/048 |
| 2018/0273077 | A1* | 9/2018 | Hussey | B62B 15/007 |
| 2020/0247454 | A1* | 8/2020 | Perkins, III | B62B 15/007 |
| 2020/0307669 | A1* | 10/2020 | Kowalski | B62B 17/005 |
| 2021/0169713 | A1* | 6/2021 | Kenalty | A61G 1/013 |
| 2021/0171084 | A1* | 6/2021 | Bankhead | B62B 15/008 |
| 2022/0354106 | A1* | 11/2022 | Hayder | B62B 13/16 |
| 2023/0311970 | A1* | 10/2023 | Cohen | B62B 13/16 280/18 |
| 2024/0000639 | A1* | 1/2024 | Lockridge | A61G 1/044 |
| 2024/0082078 | A1* | 3/2024 | Calkin | A61G 1/048 |
| 2024/0350330 | A1* | 10/2024 | Kosiorek | A61G 1/013 |

* cited by examiner

MODULAR FISH SCALE SLED

CROSS-REFERENCE TO RELATED APPLICATIONS

This application claims the benefit of U.S. Provisional Patent Application No. 63/564,323, filed on Mar. 12, 2024, which is hereby incorporated by reference in its entirety.

FIELD OF THE INVENTION

The present invention relates to the field of outdoor equipment and transportation devices, specifically to portable sleds designed for transporting game, equipment, or injured persons in challenging terrains.

BACKGROUND OF THE INVENTION

Hunting large game animals, such as deer, elk, moose, and bear, often requires venturing into remote and rugged terrains that are inaccessible to vehicles. While the thrill of the hunt draws many enthusiasts to these challenging environments, the task of transporting a harvested animal from the kill site to a more accessible location presents significant difficulties.

The traditional method of dragging a game carcass across the ground is physically demanding and can cause damage to the animal's hide, potentially reducing its value. Moreover, this method often results in contamination of the meat with dirt, debris, and other environmental contaminants, leading to increased meat wastage and more difficult cleaning processes.

Existing solutions to this problem have fallen short in various aspects. Some devices attach directly to the animal's body parts, such as hooves, legs, or neck, which can cause further damage to the hide and meat. Other solutions require two people to operate effectively, limiting their usefulness for solo hunters. Additionally, many current game transport devices are bulky, heavy, or cumbersome, making them impractical to carry into remote hunting areas.

The challenges extend beyond just the physical act of moving the game. Hunters often need to navigate through diverse and difficult terrains, including swamplands, dense forests, rocky areas, and snow-covered landscapes. Each of these environments presents unique obstacles that can impede the smooth transport of harvested game.

Furthermore, the equipment used for game transport must be lightweight and compact enough to be easily carried by the hunter during the initial trek into the hunting grounds. This requirement has led to a demand for solutions that are not only effective in transporting game but also portable and easy to deploy in the field.

Safety is another critical concern in game transport. The process of moving a heavy carcass through challenging terrain poses risks to the hunter, including physical strain and potential injuries. Additionally, in hunting environments, visibility is crucial to prevent accidents, especially during group hunts or in areas with other outdoor enthusiasts.

Existing game transport devices often lack the versatility to adapt to different sizes and weights of game animals. This limitation forces hunters to choose between multiple specialized devices or compromise on effectiveness when dealing with varying hunting scenarios.

The environmental impact of game transport solutions is also a growing concern. Many current devices are not designed for long-term durability or reusability, leading to increased waste and environmental degradation in natural habitats.

In light of these challenges, there is a clear need for an innovative game transport solution that addresses the multifaceted problems faced by hunters. Such a solution should offer improved efficiency in moving game across various terrains, protect the quality of the harvested animal, enhance safety for the hunter, and provide a lightweight, compact design that is easy to carry and deploy in the field. Additionally, the ideal solution should be versatile enough to accommodate different sizes of game and be environmentally responsible in its design and materials.

SUMMARY OF THE INVENTION

The present invention provides an innovative solution for transporting game and equipment in outdoor environments, particularly addressing the challenges faced by hunters in moving harvested animals from remote locations. The preferred embodiment comprises a uniquely designed sled that incorporates several key elements working in harmony to offer superior performance, durability, and ease of use.

At the core of the invention is a fish scale assembly design utilizing High-Density Polyethylene (HDPE) sheets. This design features overlapping panels 101 arranged in a manner reminiscent of fish scales, which significantly reduces drag and facilitates smoother movement over various terrains. The staggered configuration of these panels 101 creates an aerodynamic profile that minimizes resistance when the sled is pulled across the ground, through water, or over obstacles.

The sled's structure is modular and disassemblable, incorporating eye bolts for secure attachment. This design allows for easy assembly and disassembly in the field without the need for tools, enhancing its portability and versatility. When not in use, the sled can be disassembled for easy storage. When disassembled, it is approximately 16"×16"× ⅝" in an embodiment, making it convenient to carry into remote hunting areas in accordance with an exemplary use.

Strategic placement of straps and harnesses is another crucial element of the invention in accordance with an embodiment. These components work together to secure the load effectively and maintain balance during transport. The harness system is designed to distribute the pulling force across the user's body, reducing strain and improving control, especially on uneven or slippery surfaces. The harness system is designed to distribute the pulling force across the user's body, reducing strain and improving control, especially on uneven or slippery surfaces. In accordance with an embodiment, this system also allows for hands-free use, which is particularly helpful for maintaining balance and still allowing for the use of a weapon. The hands-free design enables the user to have both hands available, enhancing their ability to navigate challenging terrain, maintain situational awareness, and react quickly to changing conditions.

By freeing up the user's hands, the harness system significantly improves safety and versatility in hunting scenarios. It allows the hunter to maintain a ready position with their weapon while simultaneously transporting game or equipment. This aspect in an embodiment is especially valuable in environments where the user may need to respond quickly to potential threats or hunting opportunities. The hands-free capability also contributes to improved balance and stability. Without the need to manually pull or guide the sled, the user can focus on maintaining proper footing and body position when traversing difficult terrain such as steep inclines, rocky areas, or slippery surfaces. This enhanced stability reduces the risk of falls or injuries, particularly when carrying heavy loads over long distances. Furthermore, the hands-free design facilitates better observation of the surrounding environment. With both hands free, the user can more easily scan for obstacles, wildlife, or other potential hazards, enhancing overall safety and effectiveness during outdoor activities.

Safety and visibility features are integrated into the sled's design, utilizing high-visibility colors such as blaze orange. These features not only enhance the safety of the user in hunting environments but also serve multiple purposes, including aiding in quick location and retrieval of the sled in various outdoor conditions.

The combination of these elements—the fish scale assembly, modular structure, HDPE material, strategic strap placement, and safety features—creates a synergistic effect. Together, they address the multifaceted challenges of game transport, offering a solution that is efficient, durable, safe, and adaptable to various outdoor scenarios. This invention represents a significant advancement in outdoor transport technology, providing hunters and outdoor enthusiasts with a tool that enhances their ability to navigate challenging terrains while protecting their valuable game or equipment.

DETAILED DESCRIPTION

Figure 1:
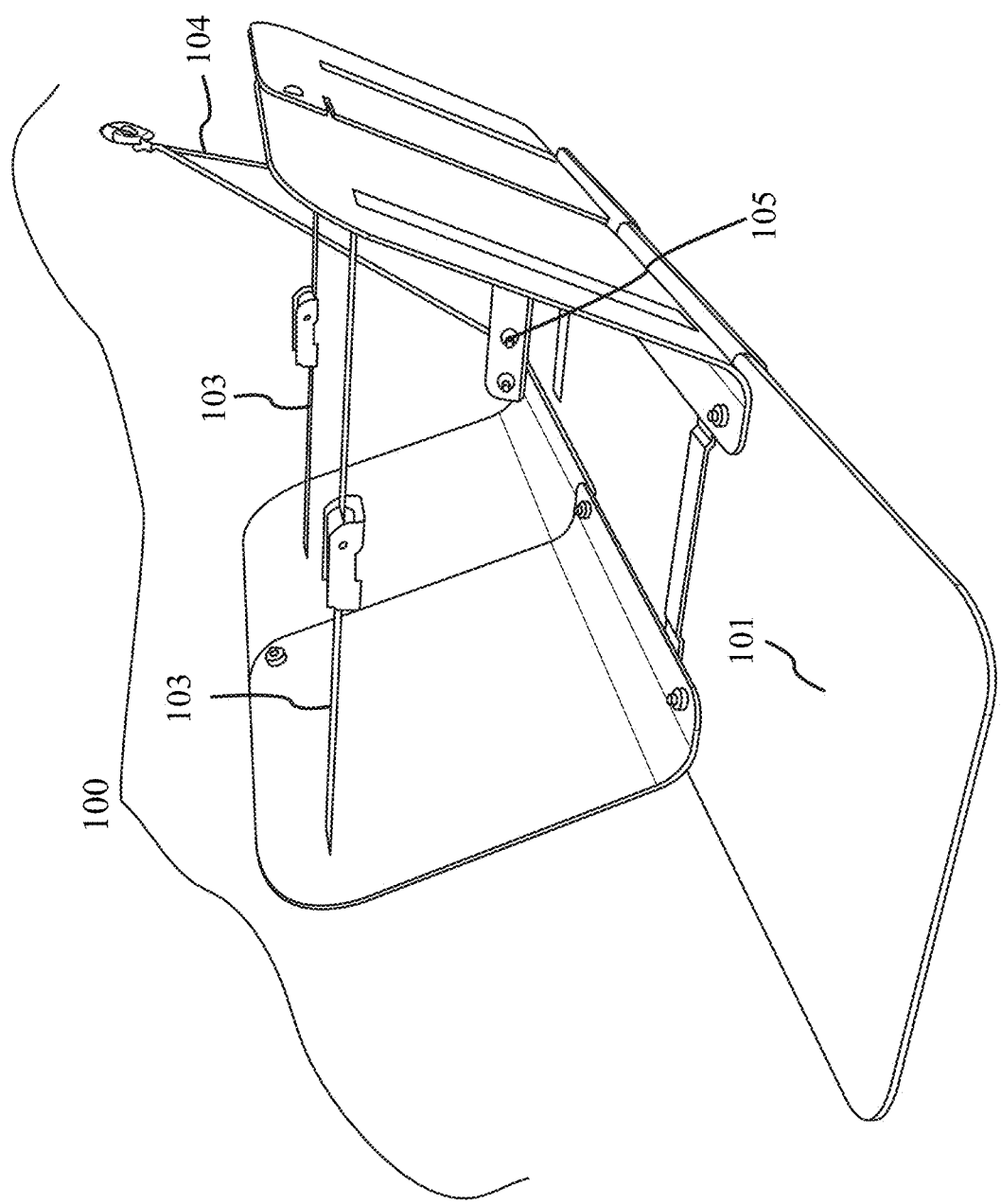
FIG. 1: A perspective view of the assembled sled in an embodiment, showing the overlapping HDPE panels in the fish-scale configuration, nylon straps, and towing rope attached to the eye bolts.

The present invention provides an innovative solution for transporting game and equipment in outdoor environments, particularly addressing the challenges faced by hunters in moving harvested animals from remote locations. The preferred embodiment of the invention comprises a uniquely designed sled 100 that incorporates several key elements working in harmony to offer superior performance, durability, and ease of use.

At the core of the preferred embodiment of the invention is a fish scale assembly design utilizing High-Density Polyethylene (HDPE) sheets 101. This design features overlapping panels 101 arranged in a manner reminiscent of fish scales, which significantly reduces drag and facilitates smoother movement over various terrains. The staggered configuration of these panels 101 creates an aerodynamic profile that minimizes resistance when the sled is pulled across the ground, through water, or over obstacles.

The sled's structure in the preferred embodiment is modular and disassemblable, incorporating eye bolts 105 for secure attachment. This design allows for easy assembly and disassembly in the field, enhancing its portability and versatility. When not in use, the sled can be disassembled for easy storage. When disassembled, it is approximately 16"× 16"×⅝", making it convenient to carry into remote hunting areas. The compact dimensions of the disassembled sled enable it to fit within a pack 102 similar in size to or otherwise resemblant of a backpack, facilitating effortless transport to remote locations. This modular design, coupled with the sled's lightweight components, addresses the key challenges of portability and versatility in game transport, allowing hunters to easily carry the sled components into remote areas and quickly assemble them when needed. In accordance with exemplary uses, aspects of the sled can be disassembled, folded, stacked and/or placed into a pack 102, making it convenient to carry into difficult to traverse environments, such as remote hunting areas.

Strategic placement of straps and harnesses is another crucial element of the preferred embodiment of the invention. These components work together to secure the load effectively and maintain balance during transport. The harness system is designed to distribute the pulling force across the user's body, reducing strain and improving control, especially on uneven or slippery surfaces.

Safety and visibility features are integrated into the sled's design in the preferred embodiment, utilizing high-visibility colors such as blaze orange. These features not only enhance the safety of the user in hunting environments but also serve multiple purposes, including aiding in quick location and retrieval of the sled in various outdoor conditions.

The combination of these elements—the fish scale assembly, modular structure, HDPE material, strategic strap placement, and safety features—creates a synergistic effect manifesting in the preferred embodiment of the invention. Together, they address the multifaceted challenges of game transport, offering a solution that is efficient, durable, safe, and adaptable to various outdoor scenarios. This embodiment represents a significant advancement in outdoor transport technology, providing hunters and outdoor enthusiasts with a tool that enhances their ability to navigate challenging terrains while protecting their valuable game or equipment.

Sled in Disassembled Form

The sled's individual components in their disassembled form in the preferred embodiment consist of several key elements that work together to create a highly efficient and versatile game transport system. The primary structural elements of the sled are High-Density Polyethylene (HDPE) sheets. In the preferred embodiment, these sheets are approximately 16 inches square and are cut and shaped with specific slots and keyholes to allow for easy assembly and disassembly. The HDPE sheets 101 have a thickness of about 2-8 millimeters thick, with approximately 3 millimeters (or in an embodiment, 0.125 inches) being the preferred thickness in accordance with the preferred embodiment, balancing durability with cost and compactness.

The specific slots and keyholes in the HDPE sheets 101 are designed to facilitate easy assembly and disassembly of the sled in accordance with an embodiment. These features are cut and shaped into the HDPE sheets 101 during the manufacturing process. The slots are typically elongated openings that allow for interlocking of adjacent sheets, while the keyholes are shaped openings that can accommodate and secure other components such as one or more structural aluminum bodies or eye bolts 105.

The shape of the cuts in the HDPE sheets 101 and the slots allow the sled to hold together with minimal use of bolts or rivets in accordance with an embodiment. The way it is assembled with specific overlaps creates a system that allows for minimal drag or friction when being pulled across difficult terrain. This assembly method is similar to fish scales in how the overlaps help to create a surface that doesn't hinder when being pulled. The same keyhole and slot system allows the product to be disassembled easily to allow it to be packed in a pack 102 such as a backpack or hunting pack and then reassembled as needed to haul gear much larger than the individual pieces.

In the preferred embodiment, the slots and keyholes are designed to be self-aligning, meaning that when the sheets are brought together in the correct orientation, the slots and keyholes naturally guide the components into their proper positions. This design feature significantly reduces assembly time and complexity, especially in field conditions where time and visibility may be limited.

To affix the individual components together, several methods are employed in accordance with various embodiments. Press-fit connections are used in some slots and keyholes, designed to create a tight, friction-based fit when components are pressed together. This method requires no additional hardware and allows for quick assembly and disassembly. For connections that require additional security, removable pins or bolts may be inserted through aligned holes in overlapping components. These can be quickly inserted or removed by hand, maintaining the tool-free assembly principle. In some embodiments, quick-release fasteners such as cam locks or spring-loaded pins are incorporated into the design. These allow for rapid securing and releasing of components while providing a strong connection during use. Some edges of the HDPE sheets 101 may feature interlocking tabs and slots that snap together, creating a secure connection without the need for additional hardware.

Eye bolts 105 are crucial components that serve multiple functions in accordance with the preferred embodiment. They are used for hauling attachment and connection to a harness or tow rope 104. In the context of an embodiment, eye bolts 105 are typically made of steel or another strong metal alloy, with dimensions appropriate for supporting the weight of a large game animal or heavy equipment. In their disassembled state, these eye bolts 105 can be removed from the structural aspects of the sled and stored separately, reducing the overall profile of the disassembled sled.

The heat treatment process applied to the HDPE panels 100 of the sled 100 during manufacturing plays a crucial role in the assembly system in accordance with an embodiment. This treatment allows the sheets to be shaped with curves that can be flattened for packing, such as into a pack 102, but will return to their curved shape when assembled. The final completed product has a curve to it that allows for much less drag and friction when moving over rough terrains.

This combination of slots, keyholes, and affixing methods results in a sled 100 that can be quickly assembled in the field, yet provides a robust and secure structure capable of transporting heavy loads across challenging terrains in accordance with the preferred embodiment. The design also ensures that the sled 100 can be easily disassembled and compactly stored when not in use, addressing the key requirements of portability and versatility for hunters and outdoor enthusiasts.

The HDPE material is chosen in accordance with the preferred embodiment for its durability, impact resistance, and low friction coefficient, making it ideal for dragging across various terrains. In their disassembled state, these sheets are flat and can be easily stacked for compact storage and transportation.

In accordance with an embodiment, the structural aluminum bodies, optionally consisting of aluminum pads and/or aluminum locking plates, are approximately 4 mm thick. This specific thickness provides an optimal balance between strength and weight for the sled's design. However, to allow for flexibility in manufacturing and potential future iterations, a broadening range of thicknesses can be considered. The aluminum pads may have a thickness ranging from approximately 2 mm to 8 mm, with 4 mm being the preferred thickness.

An aspect of the aluminum pads in accordance with an preferred is drilled holes along their length. These holes serve multiple purposes, primarily allowing for the secure attachment of eye bolts 105. The eye bolts 105 function as versatile connection points, facilitating the attachment of towing ropes 104, harnesses, or other securing mechanisms. The spacing and size of these holes are engineered to distribute forces evenly across the sled's structure, minimizing stress concentrations and enhancing overall durability.

The aluminum pads in accordance with the preferred embodiment are designed to integrate seamlessly with the HDPE sheets 101 that form the sled's body. They are typically positioned at the front of the sled 100, running parallel to the leading edge. This placement serves to reinforce the front section, which bears the brunt of the pulling forces during use. The aluminum pads may be secured to the HDPE sheets 101 through a combination of methods in accordance with various embodiments, such as bolted connections through aligned holes or by being encased within a specially designed channel formed by the overlapping HDPE sheets 101.

These aluminum plates 106 interact with other components of the sled 100 by acting as a buffer between the plastic components (primarily the HDPE panels 101) and potential obstacles encountered during use, such as rocks and tree roots. This protective function is essential in preserving the longevity of the HDPE panels 101, which might otherwise be prone to damage from repeated impacts with hard objects in rugged environments.

As the sled 100 is pulled across rugged terrain, the various aluminum plates 106 of the sled 100 act as a first line of defense against obstacles such as rocks, roots, and other debris. They are designed to integrate seamlessly with the HDPE panels 101 that form the sled's body, reinforcing the front section with metallic mass which bears the brunt of the pulling forces during use.

The aluminum pads 106 in an embodiment incorporate attachment points for eye bolts 105 or other securing mechanisms, providing robust connection points for towing ropes 104, harnesses, or other securing devices. In keeping with the sled's modular and portable design philosophy, these aluminum pads are engineered to be easily detachable. When the sled 100 is disassembled for transport or storage, the aluminum pads can be removed and stored flat alongside the HDPE sheets 101, contributing to the sled's compact storage profile. By incorporating these structural aluminum bodies with the specified thickness range and features, the sled design achieves a balance between strength, durability, and portability, making it well-suited for use in challenging hunting environments where every ounce of carried weight matters.

The main body of the sled, when disassembled, is designed to reduce flat to a compact thickness of less than one inch in the preferred embodiment, or alternatively up to 3" in alternative embodiments, facilitating easy transport and storage, such as in an exemplary embodiment within a pack 102. This slim profile is achieved through the careful engineering of the HDPE sheets 101, which are designed to lay flat when not assembled. The structural aluminum bodies can be detached from the HDPE sheets 101 and stored alongside them. The bolts used for assembly, which may include eye bolts 105 for the structural aluminum bodies and fasteners for connecting the HDPE sheets 101, are also designed to be easily removed and stored with the flattened components. This modular design allows all elements—the HDPE sheets 101, aluminum plates 106, and associated hardware—to be efficiently packed together in a slim package, making the sled 100 highly portable for transport into remote hunting areas. The use of aluminum components contributes to the sled's overall lightweight nature while maintaining structural integrity, a crucial factor in its design for ease of carry and assembly in the field.

The HDPE panels 101 that form a core structure of the sled 100 in an embodiment are precisely engineered to create the fish-scale design that is crucial to the sled's performance. The sheets are cut and shaped using advanced manufacturing techniques such as laser cutting or CNC machining with blades and rotary tools. This precision cutting ensures that each sheet has the exact dimensions and contours required for proper interlocking and overlap. The HDPE sheets 101 are designed with specific slots and keyholes that facilitate easy assembly without the need for tools. These features are strategically placed in an embodiment to allow for a secure interlocking assembly when the sheets are brought together. The slots and keyholes are engineered to be self-aligning, meaning that when the sheets are brought together in the correct orientation, they naturally guide the components into their proper positions. This curvature is essential for the sled's performance, as it allows for much less drag and friction when moving over rough terrains. The heat treatment also enables the HDPE panels 101 to be flattened for packing but return to their curved shape when assembled. The interlocking process involves positioning each subsequent sheet so that it slightly overlaps the one behind it, creating the characteristic fish-scale-like structure. This overlapping pattern is critical in an embodiment for the sled's functionality and is achieved through the precise engineering of the sheets' edges and connection points.

The functional benefits of this fish-scale design are significant in accordance with varying embodiments. The staggered panel design creates a more aerodynamic profile compared to traditional sleds with parallel panels. This streamlined shape allows the sled 100 to cut through air or water resistance more efficiently, minimizing the surface area exposed to the oncoming medium. As a result, the sled 100 encounters less drag, reducing the energy required to pull it. Further, the forward placement of the aluminum plates 106 in the fish-scale assembly contributes to improved weight distribution in an embodiment. This design prevents excessive weight concentration at the rear, which can lead to instability and increased pulling effort. By spreading the load more evenly across the sled 100, the fish-scale assembly enhances maneuverability and prevents the sled 100 from tipping or digging into soft surfaces.

The overlapping nature of the fish-scale design offers inherent protection against snagging in an embodiment. As the sled 100 encounters obstacles, the front members, optionally aluminum plates 106, act as a shield, deflecting debris and preventing it from becoming lodged between the panels 101. This feature is particularly beneficial in challenging terrains where the risk of snagging on branches, rocks, or uneven ground is higher. The overlapping design contributes to the overall strength of the sled 100 in an embodiment. Each sheet supports and reinforces the adjacent sheets, creating a more rigid and durable structure that can withstand the stresses of transporting heavy loads over rough terrain.

In water-based operations in accordance with an intended method of use in accordance with an embodiment, such as river crossings or ice rescues, the fish-scale design enhances the sled's buoyancy. The overlapping panels 101 create small air pockets that contribute to improved flotation characteristics. The overall effect of this design in the assembled sled is a structure that efficiently glides over various terrains, resists snagging and damage from obstacles, and provides a stable platform for transporting loads. The fish-scale configuration allows the sled 100 to adapt to uneven surfaces while maintaining its structural integrity, making it an effective solution for challenging outdoor environments.

During reassembly in the field, the aluminum pads are among the first components to be reintegrated into the sled structure in accordance with the preferred embodiment. Their reattachment typically involves sandwiching the HDPE panels 101 between them at the front of the sled 100, uniting the front pieces of the structure. This process maintains the tool-free assembly principle that is central to the sled's design philosophy. The aluminum sheets 106 are designed to integrate seamlessly with the HDPE sheets 101 that form the sled's body. They are positioned at the front of the sled, running parallel to the leading edge. This placement serves to reinforce the front section, which bears the brunt of the pulling forces during use. The aluminum pads may be secured to the HDPE sheets 101 through a combination of methods in accordance with various embodiments, such as bolted connections through aligned holes or by being encased within a specially designed channel formed by the overlapping HDPE sheets 101. This sandwiching technique not only provides structural integrity but also enhances the sled's ability to withstand impacts and obstacles encountered during use. This ease of assembly and disassembly, coupled with the aluminum pads' crucial role in the sled's structural integrity in accordance with the preferred embodiment, exemplifies the innovative approach to balancing strength, weight, and user-friendliness in this game transport solution.

The nylon straps included in the preferred embodiment of the sled 100 serve a crucial role in securing items to the assembled structure in accordance with the preferred embodiment. These straps are designed with a width of 1-2 inches, providing a balance between strength and flexibility. The width is carefully chosen in an embodiment to distribute the load evenly across the strap, preventing excessive wear or potential failure points. In accordance with varying embodiments he straps come in varying lengths to accommodate different load sizes and configurations. This variability allows users to secure a wide range of items, from small gear to large game animals, effectively adapting to diverse hunting and outdoor scenarios.

The different lengths also enable users to create custom securing patterns, enhancing the versatility of the sled system. The material choice of nylon for these straps is significant in accordance with the preferred embodiment. Nylon offers an excellent combination of strength, durability, and resistance to environmental factors such as moisture and UV radiation. This makes the straps well-suited for the demanding conditions often encountered in hunting and outdoor activities contemplated by the inventor for use in accordance with embodiments of the invention.

In terms of functionality, these straps are designed with ease of use in mind. They incorporate quick-release buckles or adjustable tensioning mechanisms in embodiments, allowing for rapid securing and release of loads even in challenging field conditions. This feature is particularly valuable when time is of the essence, such as when securing a harvested animal in adverse weather conditions.

When the sled 100 is disassembled for transport or storage, the straps are designed to be easily detached from the main structure in accordance with an embodiment. Their flexible nature allows them to be rolled or folded into compact bundles, taking up minimal space within the pack 102 in an embodiment. This compactibility is a key feature of the overall sled design, contributing to its portability and ease of transport to remote hunting locations.

The storage solution for these straps comprises dedicated pouches or compartments within the disassembled sled package in accordance with an embodiment, ensuring that they remain organized and readily accessible when needed for reassembly. This integration of the strap storage into the overall sled design exemplifies the attention to detail in creating a comprehensive, user-friendly game transport solution in an embodiment.

The aluminum plates 106 are a crucial component in the sled's design in accordance with the preferred embodiment, serving multiple important functions. These aluminum plates 106 are incorporated to provide additional rigidity to the overall structure, enhancing the sled's stability and load-bearing capacity. By adding this extra layer of support, the aluminum plates 106 help maintain the sled's shape and integrity, particularly when navigating challenging terrains or carrying heavy loads.

A key feature of these aluminum plates 106 in accordance with the preferred embodiment is their role as a buffer between the plastic components (primarily the HDPE sheets 101) and potential obstacles encountered during use, such as rocks and tree roots. This protective function is essential in preserving the longevity of the HDPE sheets 101, which might otherwise be prone to damage from repeated impacts with hard objects in rugged environments.

In the preferred embodiment, the aluminum plates 106 are strategically positioned near the front of the sled to serve as a leading aspect during travel. This placement is crucial for maximizing the protective function of these plates. As the sled 100 is pulled across rugged terrain, the front-mounted aluminum plates 106 act as a first line of defense against obstacles such as rocks, roots, and other debris. This positioning allows the aluminum plates 106 to absorb and deflect impacts that would otherwise directly affect the HDPE panels 101 and other components of the sled 100.

In accordance with an embodiment, a structural body refers to a component that provides reinforcement and structural integrity to the sled design. An example of a structural body is an aluminum plate 106, also referred to as an aluminum pad. These structural bodies are typically made of aluminum and are approximately 4 mm thick, with a possible range of 2 mm to 8 mm.

The structural bodies are designed to integrate seamlessly with the High-Density Polyethylene (HDPE) sheets that form the main body of the sled. They are positioned at the front of the sled, running parallel to the leading edge, and serve to reinforce the front section, which bears the brunt of the pulling forces during use.

The structural bodies in the sled design can be constructed from various materials beyond HDPE and aluminum in alternative embodiments, depending on the specific requirements for strength, weight, and durability. For example, high-strength plastics such as polycarbonate or reinforced nylon could be used to create lightweight yet robust structural components. These materials offer excellent impact resistance and can be molded into complex shapes, potentially simplifying the manufacturing process. Alternatively, composite materials like carbon fiber-reinforced polymers could provide exceptional strength-to-weight ratios, enhancing the sled's performance in demanding environments. For applications requiring increased durability, stainless steel or titanium alloys could be employed, offering superior corrosion resistance and mechanical properties. In scenarios where cost is a primary concern, reinforced fiberglass could serve as a cost-effective alternative, balancing strength and affordability. Each of these materials would need to be carefully evaluated for their ability to withstand the rigors of use in challenging terrains while maintaining the sled's essential features, such as the ability to be easily assembled and disassembled in the field.

A key feature of these structural bodies is a series of precisely drilled holes along their length. These holes serve multiple purposes, primarily allowing for the secure attachment of eye bolts 105, which function as versatile connection points for towing ropes 104, harnesses, or other securing mechanisms.

The structural bodies act as a buffer between the plastic components (primarily the HDPE sheets 101) and potential obstacles encountered during use, such as rocks and tree roots. This protective function is essential in preserving the longevity of the HDPE sheets 101.

The structural bodies are typically secured to the HDPE sheets 101 through a combination of methods, such as bolted connections through aligned holes or by being encased within a specially designed channel formed by the overlapping HDPE sheets 101.

In the preferred embodiment, these structural bodies sandwich the HDPE sheets 101 at the front of the sled, uniting the front pieces of the structure and providing crucial reinforcement. This sandwiching technique not only provides structural integrity but also enhances the sled's ability to withstand impacts and obstacles encountered during use.

The placement of aluminum plates 106 at the front of the assembled sled in accordance with the preferred embodiment creates a protective "bumper" effect, shielding the rest of the sled structure as it moves forward. This is particularly important when navigating through dense underbrush or over uneven ground, where the likelihood of encountering hard obstacles is high. By taking the brunt of these impacts, the aluminum plates 106 significantly reduce the wear and tear on the HDPE panels 101 and other more vulnerable components of the sled. This protective function is further enhanced by the inherent properties of aluminum, which can withstand repeated impacts without significant deformation or loss of structural integrity.

Moreover, the front placement of these plates 106, which in some embodiments are constructed of durable materials other than aluminum, contributes to the overall travel dynamics of the sled 100 in accordance with the preferred embodiment. As the leading edge of the assembled sled in an embodiment, they help to part vegetation and create a smoother path for the rest of the sled to follow. This not only protects the sled components but also reduces the overall drag and effort required to pull the sled 100, especially when fully loaded. The durability of the aluminum plates 106 in this position ensures that the sled 100 maintains its protective capabilities and efficient movement characteristics over extended periods of use in challenging outdoor environments.

The aluminum locking plates in an embodiment are designed to be thin, typically ranging from approximately ⅛ to ¼ inch in thickness. This slim profile is crucial for maintaining the sled's overall lightweight nature while still providing the necessary strength and protection. The dimensions of these aluminum locking plates are chosen to match the width of the HDPE panels 101 in an exemplary embodiment, ensuring a seamless integration with the sled's structure and maintaining its streamlined design.

In keeping with the sled's modular and portable design philosophy, these aluminum locking plates are engineered to be easily detachable. When the sled 100 is disassembled for transport or storage, the plates can be removed and stored flat alongside the HDPE panels 101. This feature contributes to the sled's compact storage profile, allowing all components to be efficiently packed together in a slim package. The ability to store these aluminum locking plates flat is particularly advantageous, as it minimizes the overall volume of the disassembled sled, making it easier for hunters to carry into remote areas.

The use of aluminum for the locking plates is a deliberate choice in accordance with the preferred embodiment, balancing the need for strength with the imperative of keeping the sled's weight to a minimum. Aluminum offers an excellent strength-to-weight ratio, providing the necessary durability and rigidity without significantly increasing the overall mass of the sled. This material choice aligns with the sled's design goal of being both robust and portable, suitable for use in challenging hunting environments where every ounce of carried weight matters.

Figure 4:
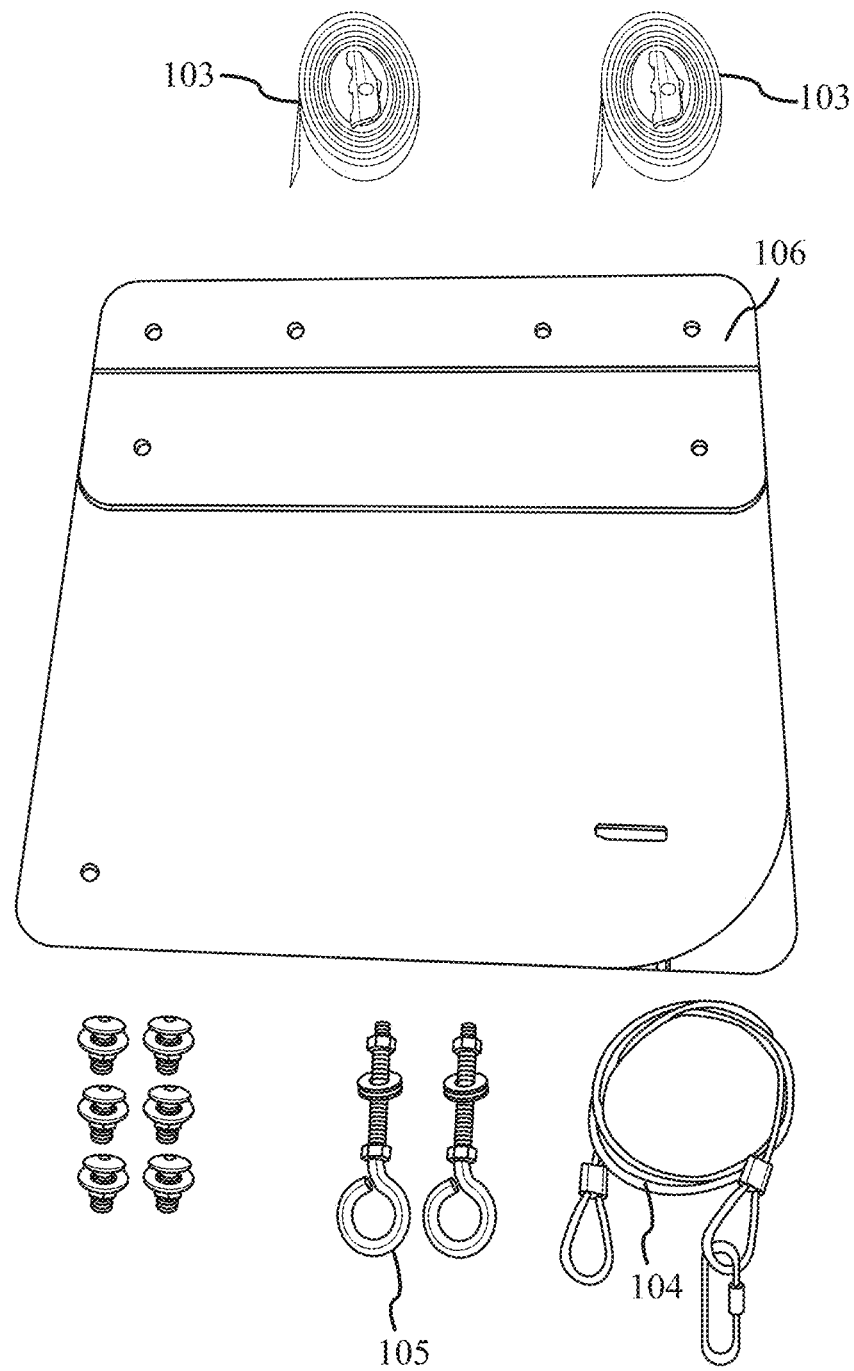
FIG. 4: A partially exploded view of the disassembled sled in an embodiment, highlighting the components in their separated forms.
Figure 5:
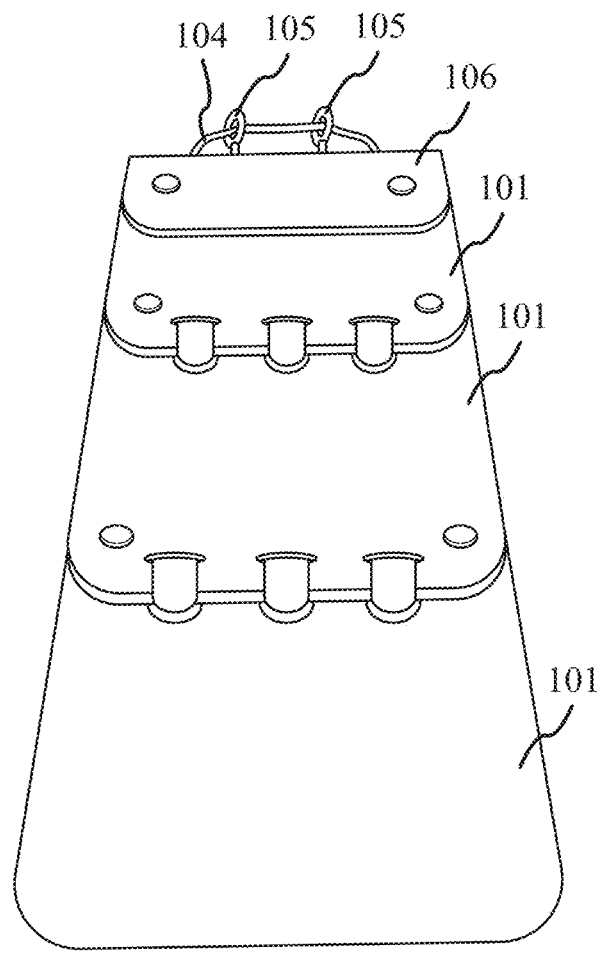
FIG. 5: A bottom rear view of the assembled sled in an embodiment, showing the arrangement of the HDPE panels, aluminum plates, and the placement of the nylon straps for securing cargo.
Figure 6:
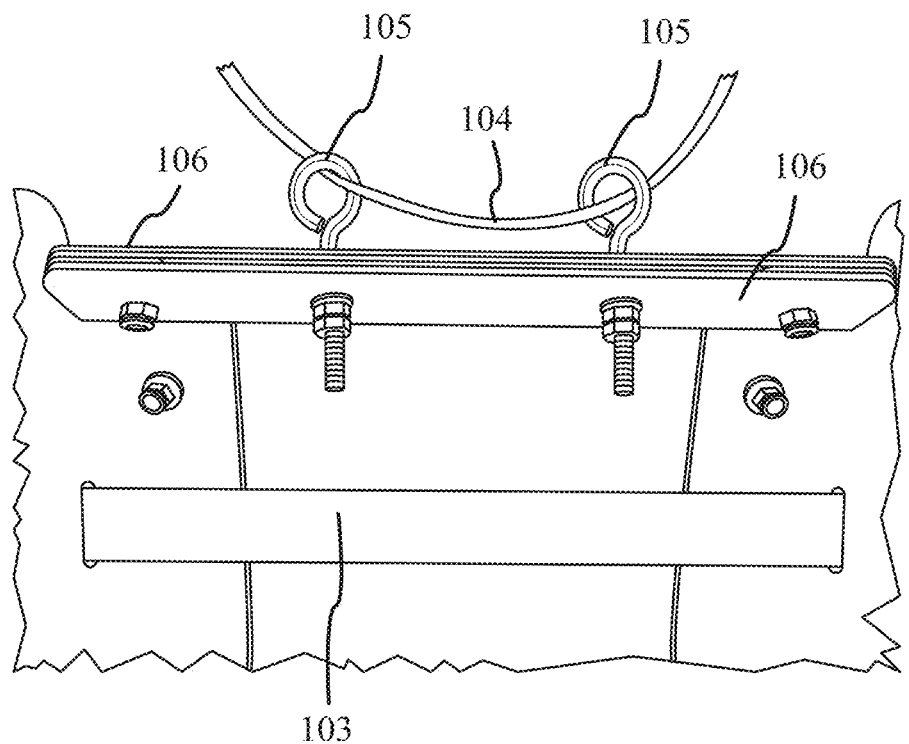
FIG. 6: A top front view of a portion of the assembled sled in an embodiment, demonstrating the placement of the straps above the HDPE panels, and the positioning of the aluminum plates the and eye bolts at the leading edge in accordance with an embodiment.

The HDPE panels 101 are cut to create specific shapes, including key and slot designs that facilitate easy assembly. While heat treatment is not necessary during manufacturing, the panels 101 can be heat treated (with a heat gun or similar) after assembly by the owner if desired. This optional heat treatment allows the panels 101 to be shaped with curves that can be flattened for packing but will return to their curved shape when assembled. However, it's important to note that this heat treatment is not essential, as the straps incorporated into the sled's design help maintain its shape during use. The curved design is crucial for reducing drag and friction when the sled 100 is in use. In the sled's disassembled state an exemplary embodiment of which is depicted by FIG. 4, the components are designed to pack flat, allowing the entire sled to fit within a pack 102, which is in an embodiment similar in size to a backpack. When fully compacted, the disassembled sled measures less than 1 inch thick, a length of 16 inches and a width of 16 inches in accordance with the preferred embodiment.

The modular nature of these components allows for flexibility in the sled's configuration. Different numbers of HDPE panels 101 can be used to create sleds of varying sizes, from smaller versions for individual use to larger configurations for transporting heavier loads or larger game. This disassemblable design, with its carefully engineered components, addresses the key challenges of portability and versatility in game transport. It allows hunters to easily carry the sled components into remote areas and quickly assemble them when needed, providing a robust and efficient solution for moving harvested game or equipment across challenging terrains.

Sled in Constructed Form

In its constructed form, the sled 100 in its preferred embodiment is a versatile and robust game transport device designed to efficiently move harvested animals or equipment across challenging terrains in accordance with intended methods of use. The assembled sled consists of multiple High-Density Polyethylene (HDPE) panels 101 that are interlocked using a system of slots and keyholes, creating a fish-scale-like structure that minimizes drag and friction during use.

The dimensions of the fully constructed sled 100 can vary based on the specific configuration, but in accordance with the preferred embodiment, it measures approximately 40 inches in length, 16 inches in width, and 14 inches in height. The HDPE panels 101, which form the bulk of the main body of the sled in the preferred embodiment, with approximately 3 millimeters being the preferred thickness for optimal balance between durability and flexibility.

At the front of the assembled sled in its preferred embodiment, one or more protective plates 106 optionally constructed of aluminum, are integrated into the design. Aluminum locking plates, approximately ⅛ to ¼ inches thick, in an exemplary embodiment are positioned near the front of the sled in the preferred embodiment to serve as a protective buffer between the plastic components and potential obstacles. These plates 106 are sized in accordance with an embodiment to match the width of the HDPE panels 101 and are securely fastened to the sled structure, creating a durable leading edge that shields the rest of the sled from impacts during use.

The HDPE panels 101 are assembled in an overlapping manner, with the slots and keyholes aligning to create a secure connection. This assembly method allows the sled 100 to maintain its structural integrity while also providing flexibility to conform to uneven terrain. The overlapping design contributes to the sled's overall strength and its ability to distribute loads evenly across its surface.

Straps 103, optionally made of nylon and typically 1-2 inches wide and of varying lengths, are integrated into the sled design through dedicated slots in the HDPE panels 101 in accordance with the preferred embodiment. These straps 103 run across the width and length of the sled, providing multiple secure points for tying down game or equipment. In the preferred embodiment, the nylon straps 103 are integrated into the sled design in a manner that prevents them from catching, snagging, or creating additional drag when interacting with the ground. The HDPE panels 101 form the primary contact surface with the terrain, while the nylon straps 103 are positioned above this surface.

The dedicated slots in the HDPE panels 101 are strategically placed to allow the nylon straps 103 to pass through from the top side of the sled in the preferred embodiment. This configuration ensures that the HDPE material remains between the ground and the nylon straps 103 throughout the sled's length and width. In an embodiment, the nylon straps 103 run substantially parallel to or substantially perpendicular to the direction of travel of the sled. The straps 103 run across the width and along the length of the sled in an alternative exemplary embodiment, creating a grid-like pattern on the upper surface.

Figure 2:
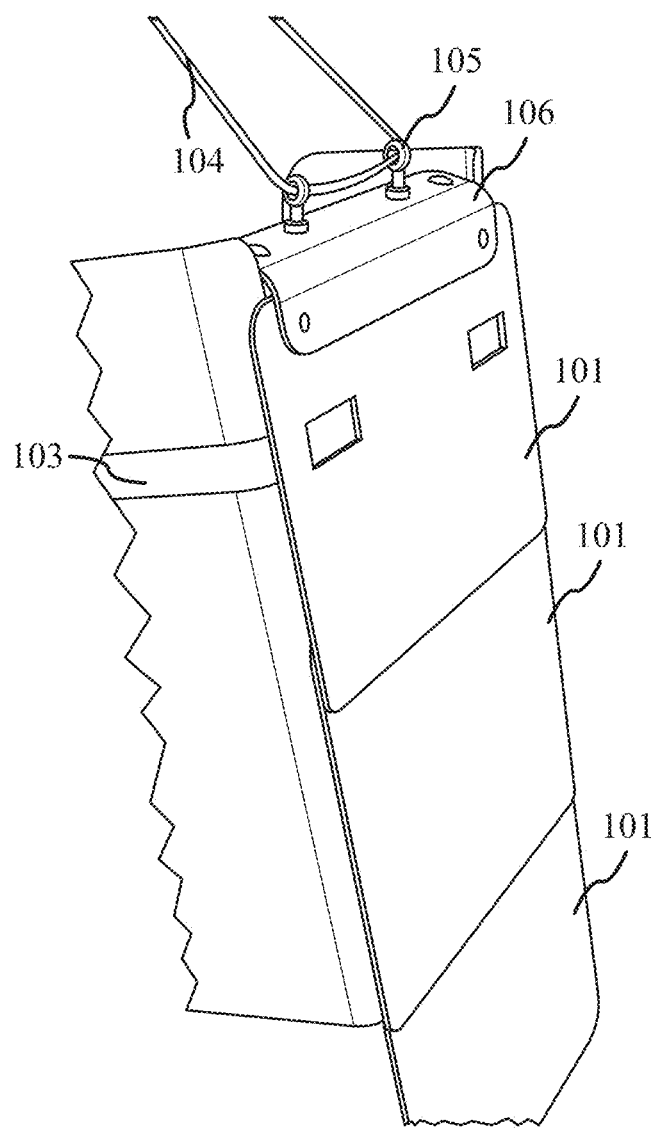
FIG. 2: A bottom view of a portion of the assembled sled in an embodiment, illustrating the smooth underside created by the overlapping HDPE panels and the positioning of the aluminum plates at the front.
Figure 3:
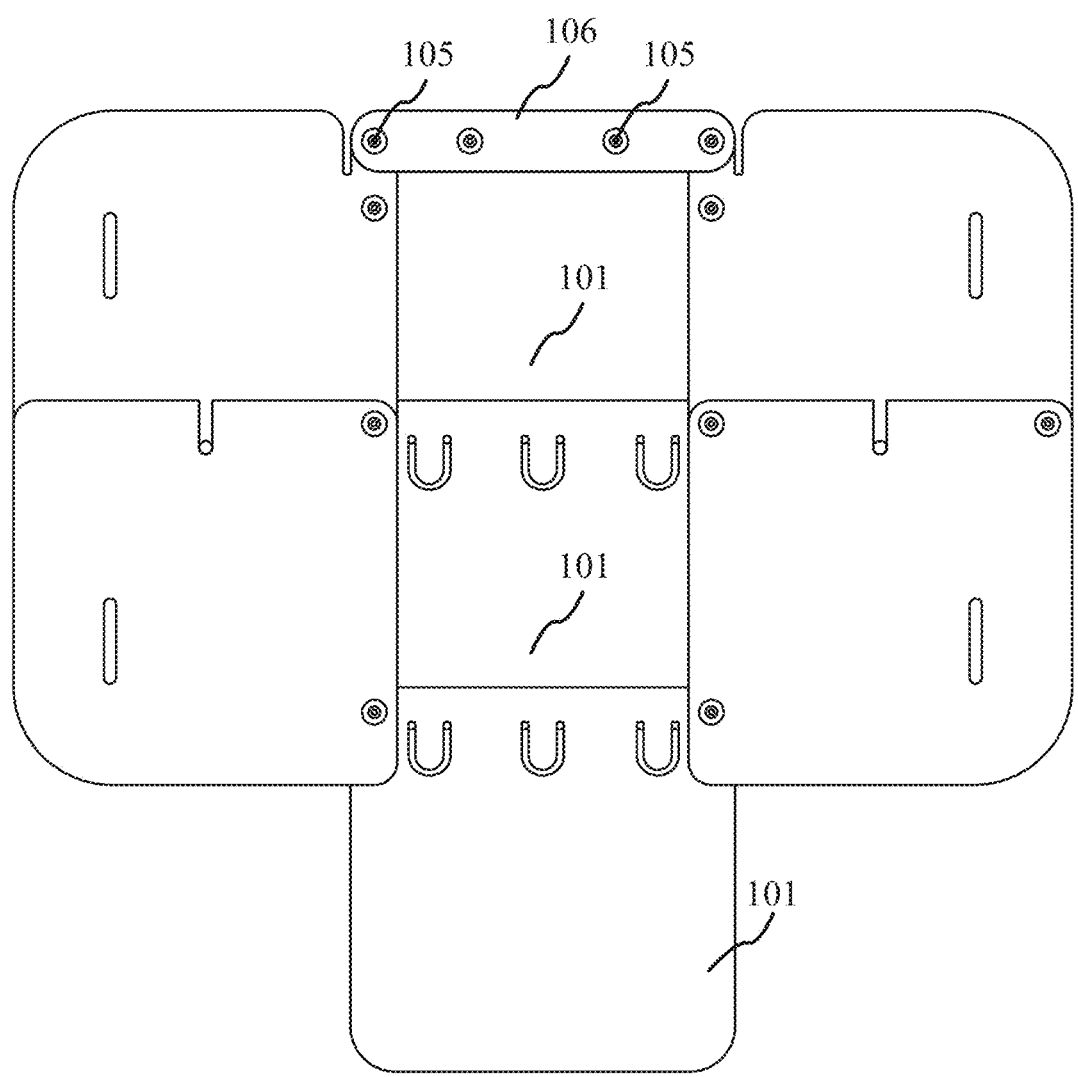
FIG. 3: An top view of the sled components in an embodiment laid flat, demonstrating the modular design and the arrangement of the components.

By positioning the straps 103 above the HDPE panels 101 in an embodiment, as demonstrated in accordance with an exemplary embodiment by FIG. 2 showing the underside of the sled, the design takes advantage of the low-friction properties of the HDPE material. This arrangement allows the sled 100 to glide smoothly over various terrains, including rocky ground, dense vegetation, and even shallow water, without the risk of the straps 103 catching on obstacles. The slots for the straps 103 are engineered to be flush with the HDPE surface, preventing any protrusion on the underside of the sled that could potentially snag on terrain features. This design detail further enhances the sled's ability to move efficiently across challenging landscapes.

Additionally, the fish-scale-like assembly of the HDPE panels 101 contributes to this protective function in an embodiment. The overlapping nature of the panels 101 helps to guide the straps 103 along predetermined paths, further ensuring they remain above the ground-contact surface. This strategic orientation of the nylon straps 103 not only prevents snagging and additional drag but also protects the straps 103 from wear and tear caused by direct ground contact. By keeping the straps 103 elevated from the ground, the design extends their lifespan and maintains their integrity for securing loads effectively.

The multiple secure points provided by this strap configuration allow for versatile and robust tying down of game, equipment, or other cargo in accordance with various embodiments. The straps 103 can be easily accessed and manipulated from the top of the sled 100, facilitating quick and efficient securing of loads without compromising the sled's smooth movement over terrain.

The interaction between these components creates a cohesive and functional structure. The HDPE panels 101 form the main body and sliding surface of the sled in accordance with the preferred embodiment. The structural members, optionally the aluminum locking plates, located at the front of the sled provide rigidity and in an embodiment comprise an attachment point for towing. The aluminum locking plates reinforce the front edge and protect against impacts. The nylon straps 103, when tensioned, help to maintain the sled's shape under load and secure the cargo.

In accordance with an embodiment, the assembled sled features a curved profile. This curvature, along with the fish-scale-like assembly of the panels 101, contributes to reduced drag and improved maneuverability when the sled is in use.

In its constructed form, the sled in its preferred embodiment combines the strength and durability necessary for transporting heavy loads with the flexibility required to navigate varied terrain. The modular design allows for easy assembly and disassembly in the field, while the carefully chosen materials and construction methods ensure that the sled remains lightweight and portable when not in use.

Fish Scale Design

The fish scale design is a key feature of the sled in its preferred embodiment, providing several functional benefits that enhance its performance and durability. This design is characterized by the staggered arrangement of overlapping HDPE panels 101, which mimics the structure of fish scales.

In the assembled sled in an embodiment, the fish scale configuration is achieved through the precise cutting and shaping of the HDPE panels 101. Each sheet is designed with specific slots and keyholes that allow for a secure interlocking assembly. When these panels 101 are brought together, they create an overlapping pattern where the edge of one sheet slightly covers the edge of the adjacent sheet, similar to how fish scales overlap.

This overlapping structure serves multiple purposes:

The staggered panel design creates a more terradynamic and aerodynamic profile compared to traditional sleds with parallel panels. This streamlined shape allows the sled to cut through terrain, air or water resistance more efficiently, minimizing the surface area exposed to the oncoming medium. As a result, the sled encounters less drag, reducing the energy required to pull it.

The forward placement of the front aluminum plates 106 in the preferred embodiment in the fish scale assembly contributes to improved weight distribution. This design prevents excessive weight concentration at the rear, which can lead to instability and increased pulling effort. By spreading the load more evenly across the sled, the fish scale assembly enhances maneuverability and prevents the sled from tipping or digging into soft surfaces.

The overlapping nature of the fish scale design in accordance with the preferred embodiment offers inherent protection against snagging. As the sled encounters obstacles, the forward members, optionally aluminum plates 106, act as a shield, deflecting debris and preventing it from becoming lodged between the panels 101. This feature is particularly beneficial in challenging terrains where the risk of snagging on branches, rocks, or uneven ground is higher.

The overlapping design contributes to the overall strength of the sled in accordance with the preferred embodiment. Each sheet supports and reinforces the adjacent panels 101, creating a more rigid and durable structure that can withstand the stresses of transporting heavy loads over rough terrain. In water-based operations, such as river crossings or ice rescues, the fish scale design enhances the sled's buoyancy. The overlapping panels 101 create small air pockets that contribute to improved flotation characteristics.

In the preferred embodiment, the fish scale design is implemented through careful engineering of the HDPE panels 101. The panels 101 are cut with precise angles and dimensions to ensure proper overlap when assembled. The slots and keyholes are positioned to create a secure connection between adjacent panels 101 while maintaining the overlapping pattern. The assembly process reflects the fish scale design by ensuring that each sheet is positioned slightly forward and overlapping the sheet behind it in accordance with the preferred embodiment. This creates a continuous, smooth surface from the rear to the front of the sled, with each "scale" providing a seamless transition to the next.

The overall effect of this design in the assembled sled is a structure that efficiently glides in accordance with the preferred embodiment over various terrains, resists snagging and damage from obstacles, and provides a stable platform for transporting loads. The fish scale configuration allows the sled to adapt to uneven surfaces while maintaining its structural integrity, making it an effective solution for challenging outdoor environments.

Safety and Visibility Features

The preferred embodiment of the sled incorporates several safety and visibility features to enhance its functionality and user safety during use.

The sled in its preferred embodiment comprises high-visibility colors, particularly "hunter orange." This color choice serves multiple purposes. Primarily, it acts as a safety device, making the sled highly visible in outdoor environments. This visibility is crucial for preventing other hunters from mistakenly targeting the sled and its contents as game, especially when transporting harvested animals.

The use of bright, contrasting colors like hunter orange also has practical applications beyond safety in accordance with embodiments of the invention. These colors can serve as visual markers for aiming or tracking during transport. For instance, a brightly colored strap attached to the front of the sled can be a clear reference point for aligning the load. In low-light conditions or dense foliage, these high-visibility elements expedite the location of the sled, particularly if it becomes detached or separated from the user.

In emergency situations, the bright-colored components of the sled in an embodiment can be used as makeshift signals to attract attention. By creating a large, contrasting visual, it can increase the chances of being spotted by rescuers. This feature is particularly valuable in search and rescue operations or when immediate assistance is required.

For military applications or situations requiring discretion in an alternative embodiment, the sled can be modified with camouflage-patterned HDPE panels 101 or a removable camouflage cover. This allows for adaptability between high-visibility for safety and low-visibility for covert operations when necessary.

The material choice for the sled also contributes to its safety features in accordance with an embodiment. The High-Density Polyethylene (HDPE) used in the construction is inherently buoyant, making it suitable for use in water-based operations such as river crossings or ice rescues. This buoyancy adds an extra layer of safety when navigating water obstacles.

Additionally, the fish-scale design of the sled not only improves its performance but also enhances safety in accordance with embodiments. The overlapping panels 101 create a smooth surface that reduces the risk of snagging on obstacles, which is crucial when moving through dense vegetation or over rough terrain. This design feature minimizes the chances of sudden stops or jerks that could potentially injure the user or damage the transported items.

The sled's modular design in an embodiment, allowing for easy assembly and disassembly, also contributes to its safety features. In emergency situations, this modularity enables rapid deployment, which can be critical in time-sensitive rescue operations.

Overall, these safety and visibility features work in concert in embodiments to create a sled that is not only functional for transporting game or equipment but also prioritizes user safety and adaptability in various outdoor scenarios.

Preferred Method of Assembly

The assembly method for the sled in its preferred embodiment involves a systematic process that leverages its modular design and fish-scale-like structure. This method begins with laying out all components and arranging the High-Density Polyethylene (HDPE) panels 101 in the correct sequence. The process then progresses through interlocking and securing the HDPE panels 101, installing the structural aluminum bodies and eye bolts 105, positioning the aluminum locking plates 106, and threading the nylon straps 103. Each step is carefully executed to ensure the proper formation of the fish-scale assembly, culminating in a final inspection and functionality test. This comprehensive assembly process is designed to be completed without specialized tools, allowing for quick and efficient setup in field conditions while ensuring the sled's optimal performance and durability.

Laying out components: Begin by carefully arranging all the High-Density Polyethylene (HDPE) panels 101, aluminum locking plates 106, nylon straps 103, and any necessary hardware such as eye bolts 105 on a flat surface. This step ensures all parts are accounted for and easily accessible during assembly.

Arranging HDPE panels: Position the HDPE panels 101 in the correct sequence according to their unique shapes and sizes. Each sheet is designed with specific slots and keyholes that facilitate easy assembly without the need for tools. The panels 101 should be arranged in a manner that reflects the final fish-scale-like structure of the assembled sled.

Interlocking HDPE sheets 101: Starting from the rear of the sled, begin the process of interlocking the HDPE panels 101. Each subsequent sheet should overlap the one behind it, creating the characteristic fish-scale-like structure. The precision-cut slots and keyholes are engineered to be self-aligning, naturally guiding the components into their proper positions and ensuring a secure fit.

Securing overlapping sections: As a user progresses with interlocking the panels 101, meticulously ensure that each overlapping section is properly secured. Some connections may utilize press-fit methods, where the slots and keyholes create a tight, friction-based fit. Other connections might require the insertion of removable pins or bolts through aligned holes for additional security.

Installing structural aluminum bodies: Once the main body of the sled is assembled, proceed to attach the aluminum pads 106 to the front of the sled. These aluminum pads 106, typically 4 mm thick (with a range of 2 mm to 8 mm), are carefully positioned to sandwich the HDPE panels 101 at the leading edge. This process unites the front pieces of the sled, serving as a crucial reinforcing element for the sled structure. The aluminum pads are secured to the HDPE panels 101 through a combination of methods, such as bolted connections through aligned holes or by being encased within a specially designed channel formed by the overlapping HDPE panels 101. This sandwiching technique not only provides structural integrity but also enhances the sled's ability to withstand impacts and obstacles encountered during use.

Attaching eye bolts: Install the eye bolts 105 into the pre-drilled holes in the aluminum locking plates. These eye bolts 105 serve as essential connection points for towing ropes 104, harnesses, or other attachments. Ensure each eye bolt is securely fastened to withstand the forces exerted during towing.

Positioning aluminum locking plates: Carefully place the aluminum locking plates near the front of the sled, aligning them precisely with the designated attachment points on the HDPE panels 101. Secure these plates firmly to reinforce the leading edge of the sled. These plates, typically ⅛ to ¼ inch thick, serve as a protective buffer between the plastic components and potential obstacles.

Threading nylon straps: Insert the nylon straps 103 through the dedicated slots in the HDPE panels 101. Pay careful attention to ensure that the straps 103 are positioned above the HDPE surface. This positioning is crucial to prevent the straps 103 from catching on the ground during use, maintaining the sled's smooth gliding action over various terrains.

Verifying fish-scale assembly: Conduct a thorough check to ensure that each HDPE sheet is correctly positioned, slightly forward and overlapping the sheet behind it. This creates a continuous, smooth surface from the rear to the front of the sled, mimicking the efficient structure of fish scales. This design is crucial for the sled's performance in reducing drag and enhancing maneuverability.

Performing final inspection: Conduct a comprehensive inspection of all connections, ensuring that all components are securely fastened. Pay particular attention to the sled's curved profile, which is crucial for its performance. This curvature contributes to reduced drag and improved maneuverability when the sled is in use.

Testing functionality: After assembly, perform a brief functional test to ensure all components work together as intended. This may include checking the movement of any pivoting parts, testing the security of the eye bolts 105, and verifying that the nylon straps 103 can be properly tensioned.

Preparing for use or storage: If the sled is to be used immediately, ensure all safety features are in place, including any high-visibility elements. If the sled is to be stored, perform disassembly according to the design specifications, leveraging its modular nature for compact storage.

Preferred Method of Dissassembly

The disassembly method for the sled in its preferred embodiment involves a systematic process that reverses the assembly steps, leveraging its modular design for easy breakdown and compact storage. Here is a detailed description of the disassembly process:

Removing cargo and straps: Begin by carefully removing any cargo, game or equipment secured to the sled. Untie and remove all nylon straps 103 from their dedicated slots in the HDPE panels 101. Coil the straps 103 neatly for storage, ensuring they remain free of tangles or knots.

Detaching aluminum locking plates: Carefully remove the aluminum locking plates from the front of the sled. These plates, typically ⅛ to ¼ inch thick, are designed to be easily detachable. Store them flat alongside the HDPE panels 101 to maintain their integrity and minimize storage space.

Removing eye bolts: Unscrew and remove the eye bolts 105 from the pre-drilled holes in the structural members, optionally the aluminum plates 106, at the front of the sled. Store these securely with other hardware components to prevent loss.

Detaching structural aluminum bodies: Carefully remove the aluminum plates 106 (also referred to as aluminum pads) from their position at the front of the sled where they sandwich the HDPE panels 101. These aluminum components should separate easily from the HDPE panels 101 once any securing mechanisms, such as bolts or fasteners, are released. The aluminum pads are designed to be easily detachable, in keeping with the sled's modular and portable design philosophy. Once removed, the pads can be stored flat alongside the HDPE panels 101, contributing to the sled's compact storage profile.

Separating HDPE sheets: Starting from the front of the sled, begin the process of separating the interlocked HDPE panels 101. Carefully disengage each sheet from its neighboring components, paying attention to the precision-cut slots and keyholes that form the fish-scale-like structure.

Disengaging overlapping sections: As you progress with separating the sheets, meticulously disengage each overlapping section. For connections using press-fit methods, apply gentle pressure to release the friction-based fit. For sections secured with removable pins or bolts, carefully remove these fasteners and store them securely.

Flattening HDPE sheets: Once all sheets are separated, carefully flatten each HDPE sheet. The sheets are designed to return to a flat state when not assembled, facilitating compact storage. Handle the sheets with care to maintain their heat-treated curvature for future reassembly.

Organizing components: Arrange all disassembled components in a logical order that will facilitate easy reassembly. Group similar parts together, such as all HDPE panels 101, hardware components, and straps 103.

Securing small parts: Gather all small hardware components such as eye bolts 105, pins, and any other fasteners. Place these in a secure container or bag to prevent loss during storage or transport.

Preparing for storage: Stack the flattened HDPE panels 101 together. The main body of the sled, when disassembled, should pack flat to a compact thickness of less than 1" in accordance with the preferred embodiment. Place the aluminum structural bodies, locking plates, and the bag of hardware components alongside the stacked sheets.

Figure 7:
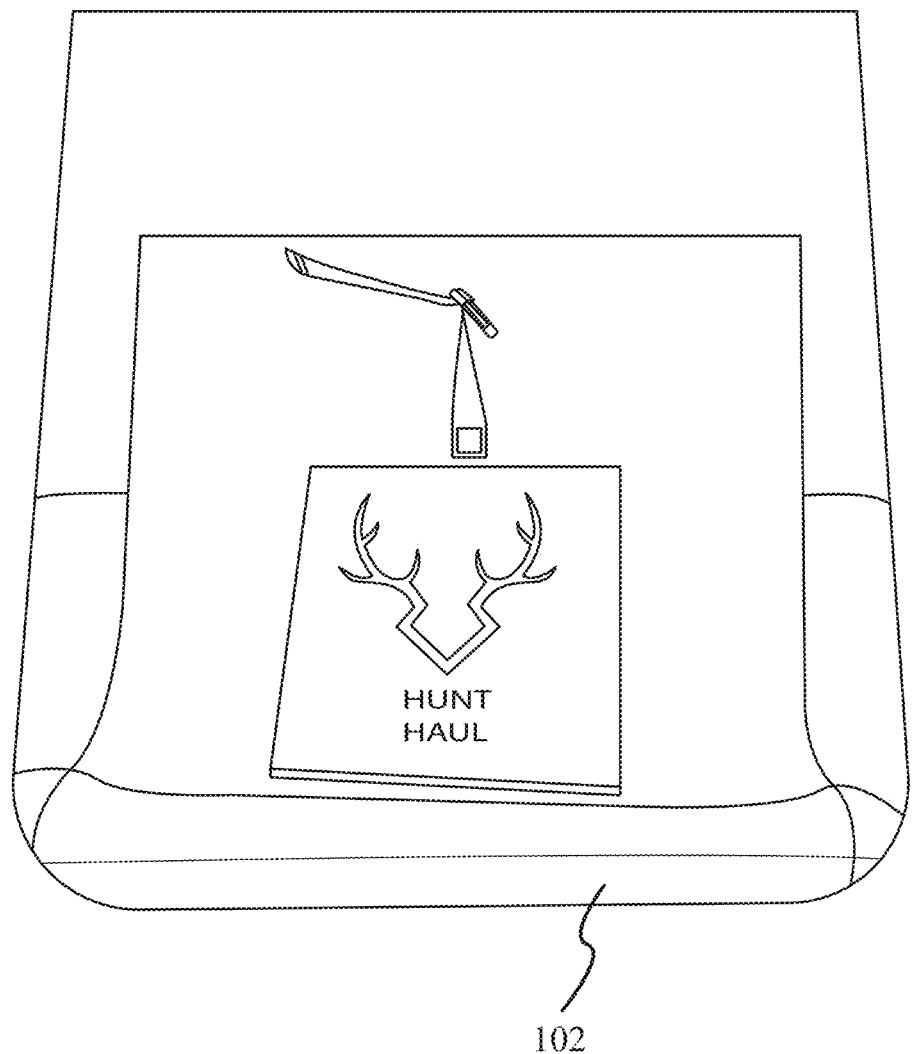
FIG. 7: An illustration of the disassembled sled components packed into a pack in an embodiment.

Packing for transport: If necessary, place all components into a suitable carrying bag or backpack. The modular nature of the sled allows for efficient packing, with all elements-HDPE panels 101, aluminum pipe, aluminum plates 106, straps 103, and associated hardware-fitting into a slim package, such as the pack 102 as depicted in FIG. 7 in an exemplary embodiment. In an embodiment, a custom pack 102 is shipped with the product that allows for all components to be stored easily and also serves as a backpack. This custom bag is designed to accommodate the disassembled sled components. The bag's backpack functionality enables users to conveniently carry the disassembled sled into remote hunting areas, addressing the key challenges of portability and versatility in game transport. The custom bag's design ensures that all sled components, including the HDPE panels 101, aluminum pads, straps, and hardware, are organized and readily accessible when needed for reassembly in the field.

This disassembly process is designed to allow for quick and efficient breakdown in field conditions. In an embodiment, the disassembly is facilitated with simple tools such as a wrench that may be enclosed with other aspects of the product. The modular nature of the components facilitates easy disassembly and compact storage, making the sled highly portable for transport into remote areas.

Preferred Method of Use

The preferred method of use for the sled involves several steps, designed to maximize its efficiency and versatility in various terrains and situations. This method accommodates both human-powered and motorized vehicle towing options:

Preparing the sled: Begin by assembling the sled if it's not already in its constructed form. Ensure all HDPE panels 101 are properly interlocked in their fish-scale configuration, one or more aluminum plates 106 is securely attached at the front, and all eye bolts 105 are in place.

Positioning the cargo: Place the game, equipment, cargo or person to be transported onto the assembled sled. For game transportation, position the animal so that its body lies along the longitudinal axis of the sled.

Securing the load: Utilize the nylon straps 103 integrated into the sled design to secure the cargo. Thread the straps 103 through the dedicated slots in the HDPE panels 101, ensuring they remain above the ground-contact surface to prevent snagging. For game transportation, consider securing the animal's legs or other aspects of the carcass to the sled with straps 103.

Attaching towing mechanism: For human-powered towing, connect a towing harness or rope 104 to the eye bolts 105 on the structural members located at the front of the sled. If using a motorized vehicle such as a snowmobile or ATV, attach an appropriate towing rope 104 or chain to these same eye bolts 105, ensuring a secure connection to the vehicle's hitch.

Adjusting for optimal weight distribution: Ensure the load is evenly distributed on the sled to maintain balance and ease of movement. The fish-scale design of the sled helps optimize weight distribution, preventing excessive concentration at the rear.

Initiating movement: Begin towing the sled, either by human power or with a motorized vehicle. If towing by hand, use the attached harness or rope, leveraging body weight and leg strength for efficient pulling. For motorized towing, start the vehicle and begin moving slowly, allowing the sled to align itself behind the vehicle.

Navigating terrain: When traversing rough or uneven terrain, take advantage of the sled's low-friction bottom surface and fish-scale design. These features allow the sled to glide smoothly over obstacles, minimizing the risk of snagging or becoming stuck.

Adjusting towing technique: For human-powered towing over long distances, consider alternating between different pulling methods to reduce fatigue. Options include using a hip belt, shoulder harness, or hand-held towing straps 103. When using a motorized vehicle, maintain a steady speed and be prepared to adjust based on terrain conditions.

Monitoring load security: Periodically check the security of the load, especially when traversing challenging terrain. Adjust straps 103 as necessary to maintain a tight and secure hold on the cargo.

Completing transport: Upon reaching the destination, carefully remove the cargo from the sled. For game transportation, this may involve untying the securing straps 103 and carefully lifting the animal off the sled.

Cleaning and storing: After use, clean the sled thoroughly, taking advantage of its water-resistant properties. The recommended cleaning method is to use water and dish soap. Wipe the sled dry or allow it to air dry in warmer climates. This cleaning process helps maintain the sled's performance and longevity by removing dirt, debris, or biological matter that may have accumulated during use. Once clean and dry, the sled can be disassembled for compact storage or left assembled for immediate future use. The ease of cleaning is a key feature of the HDPE material used in the sled's construction, contributing to its low-maintenance nature and extending its lifespan.

This exemplary method of use ensures efficient and safe transportation of cargo across various terrains, whether the sled is pulled by hand or towed behind a motorized vehicle. The versatility of the design allows for adaptation to different situations and environments, making it a valuable tool for outdoor activities and emergency situations alike.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A portable sled for transporting cargo in outdoor environments, comprising: a plurality of High-Density Polyethylene (HDPE) panels arranged in an overlapping fish-scale configuration; one or more protective bodies consisting of aluminum locking plates positioned near the front of the sled to reinforce a leading edge; a plurality of eye bolts attached to the one or more protective bodies at the front portion of the sled; a plurality of straps extending through dedicated slots in the plurality of HDPE panels for securing cargo; and wherein the sled is disassemblable for compact storage and transportation.

2. The portable sled of claim 1, wherein the fish-scale configuration of the HDPE panels reduces drag, optimizes weight distribution, and minimizes snagging on obstacles.

3. The portable sled of claim 1, wherein the HDPE panels are between 1-10 millimeters thick.

4. The portable sled of claim 3, wherein the HDPE panels are approximately 3 millimeters thick.

5. The portable sled of claim 1, wherein the sled incorporates high-visibility colors for safety and visibility in outdoor environments.

6. The portable sled of claim 1, wherein the sled is buoyant and suitable for use in water-based operations.

7. A method of assembling a portable sled for transporting cargo in outdoor environments, comprising:
   laying out a plurality of High-Density Polyethylene (HDPE) sheets;
   arranging the HDPE panels in a predetermined sequence;
   interlocking the HDPE panels to form an overlapping fish-scale configuration;
   attaching a structural body to a front portion of the interlocked HDPE panels, wherein the structural body comprises aluminum locking plates being positioned near the front of the sled;
   connecting eye bolts through pre-drilled holes in the aluminum locking plates of the structural body;
   threading nylon straps through dedicated slots in the HDPE panels; and
   verifying the integrity of the fish-scale assembly.

8. The method of claim 7, further comprising heat-treating the HDPE panels to maintain a curved shape when assembled and flatten for storage.

9. The method of claim 7, wherein the fish-scale configuration of the HDPE panels reduces drag, optimizes weight distribution, and minimizes snagging on obstacles.

10. A system for transporting cargo in outdoor environments, comprising: a portable sled with a plurality of High-Density Polyethylene (HDPE) sheets arranged in an overlapping fish-scale configuration; one or more structural bodies comprising aluminum locking plates positioned near a front of the sled to reinforce a leading edge; a plurality of eye bolts installed through pre-drilled holes in the one or more structural bodies at the front portion of the sled; a plurality of nylon straps for securing cargo; a towing mechanism selected from the group consisting of a harness for human-powered towing and a towing rope for motorized vehicle towing; and wherein the sled is disassemblable for compact storage and transportation.

11. The system of claim 10, wherein the sled incorporates high-visibility colors for safety and visibility in outdoor environments.

* * * * *